(12) United States Patent
Bolster

(10) Patent No.: US 6,966,334 B2
(45) Date of Patent: Nov. 22, 2005

(54) FLOAT VALVE FOR A CHRISTMAS TREE WATERING SYSTEM

(76) Inventor: Michael Bolster, 20 Columbus Street, Perth-Andover, New Brunswick (CA) E7H 1T3

( * ) Notice: Subject to any disclaimer, the term of this patent is extended or adjusted under 35 U.S.C. 154(b) by 335 days.

(21) Appl. No.: 10/601,782

(22) Filed: Jun. 24, 2003

(65) Prior Publication Data

US 2004/0261854 A1 Dec. 30, 2004

(51) Int. Cl.[7] .............................................. F16K 31/18
(52) U.S. Cl. ....................... 137/434; 137/429; 137/433; 137/448; 47/40.5; 47/79; 73/322.5; 73/317; 222/67
(58) Field of Search ................................ 137/434, 429, 137/433, 448, 430, 442, 437; 47/40.5, 48.5, 47/79; 222/67; 73/322.5, 305, 317

(56) References Cited

U.S. PATENT DOCUMENTS

| | | | |
|---|---|---|---|
| 3,766,939 A | * 10/1973 | Reitman | 137/434 |
| 5,072,751 A | * 12/1991 | Lin | 137/429 |
| 5,076,009 A | 12/1991 | Cibor | 47/40.5 |
| 5,090,443 A | 2/1992 | Jacobsen | 137/429 |
| 5,473,838 A | 12/1995 | Denbigh | 47/40.5 |
| 5,522,179 A | 6/1996 | Hollis | 47/40.5 |
| 5,575,110 A | 11/1996 | Couture | 47/40.5 |
| 5,867,929 A | * 2/1999 | Jung et al. | 47/40.5 |
| 5,937,574 A | 8/1999 | Jacques | 47/40.5 |
| 6,073,390 A | 6/2000 | Baudier | 47/40.5 |
| 6,260,303 B1 | 7/2001 | Sappenfield | 47/40.5 |
| 6,347,479 B1 | 2/2002 | Greenberg | 47/48.5 |

* cited by examiner

Primary Examiner—Kevin Lee
(74) Attorney, Agent, or Firm—Mario Theriault

(57) ABSTRACT

The float valve has a water inlet, a perforated bottom surface and a lift valve mounted between the water inlet and the bottom surface. A float and a rocker arm are used to raise and lower the disc of the lift valve in response to a water level inside the housing. The valve seat has a first vertical axis and the water inlet has a second vertical axis and the first and second vertical axes are parallel to each other and are spaced apart a distance corresponding substantially to a radius of the valve seat. In another feature, a stud on the rocker arm interferes with the valve stem when the float is in a down position, for leaning the valve stem away from the axes of the valve seat and of the water inlet.

20 Claims, 3 Drawing Sheets

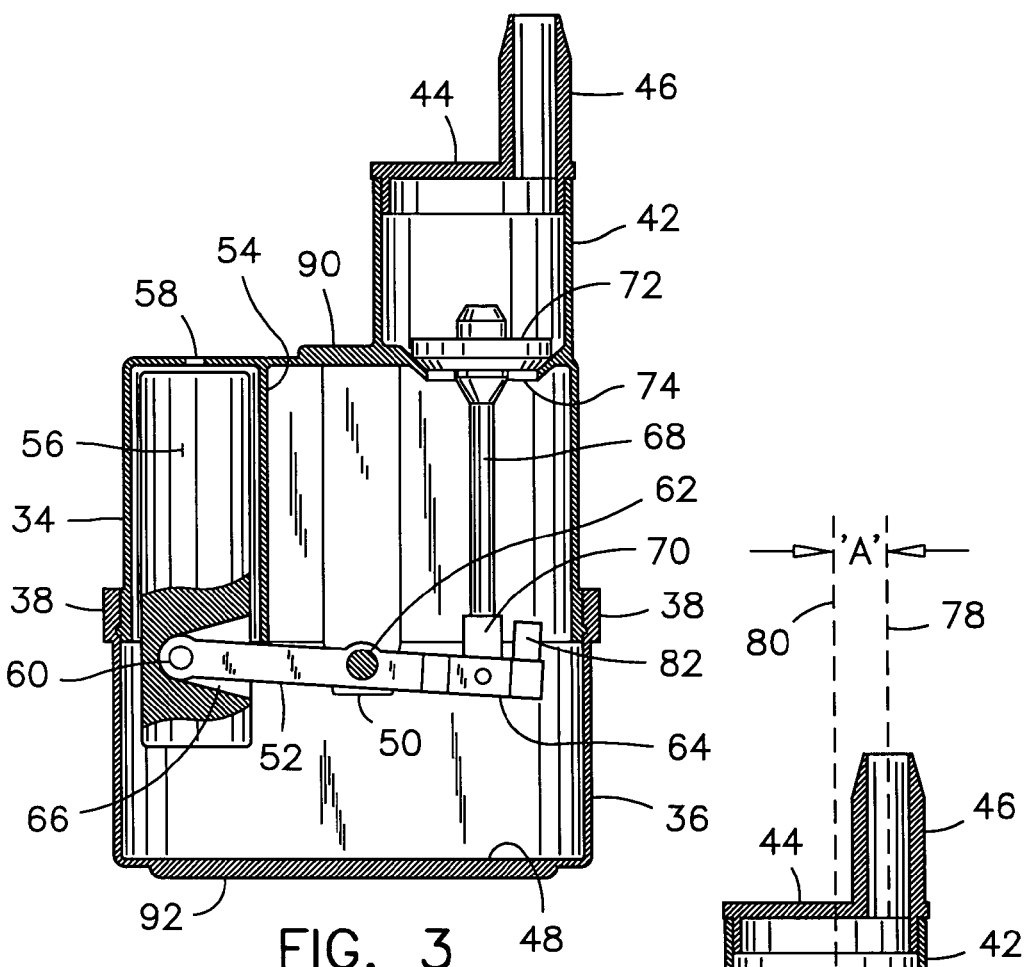
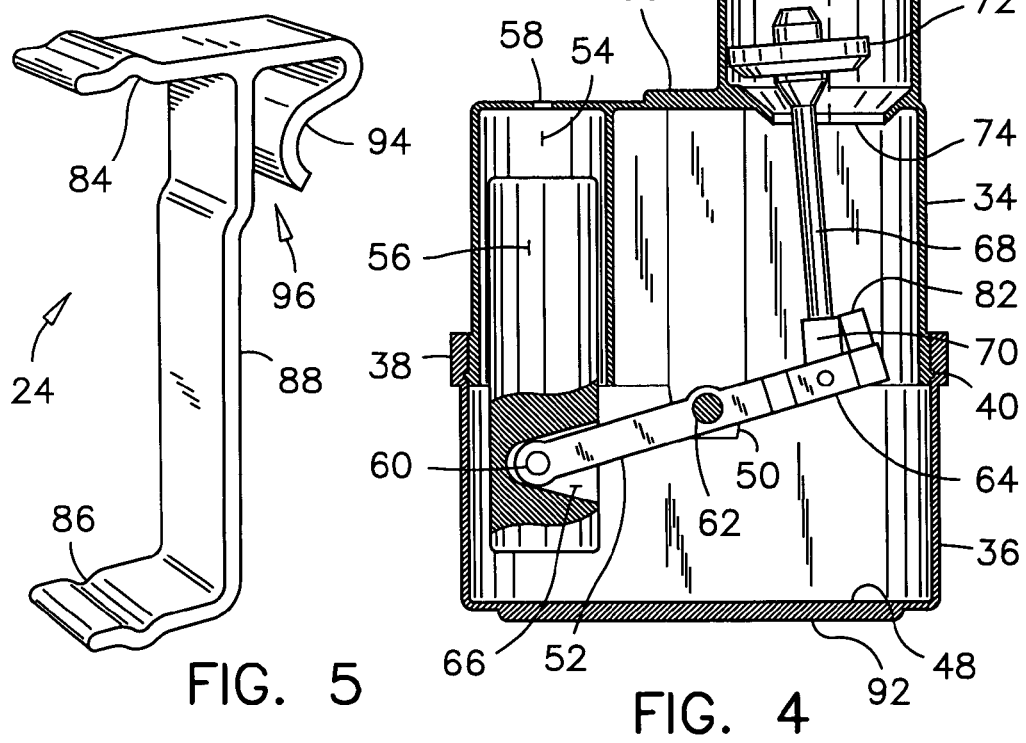

FLOAT VALVE FOR A CHRISTMAS TREE WATERING SYSTEM

FIELD OF THE INVENTION

This invention pertains to Christmas tree watering devices and more particularly, it pertains to a float valve connected to a hose and a funnel to fill the reservoir of a Christmas tree stand with water from an elevated position.

BACKGROUND OF THE INVENTION

Generally, a natural Christmas tree has lower branches that extend more than an arm's length around its stand. The tree stand is often covered with decorating paper and snow-imitating wool or is hidden by a manger. Wrapped gifts are stowed around the tree stand for several days and even weeks preceding Christmas eve. Therefore, the reservoir of a tree stand is hardly accessible to add water therein.

For all these reasons, a hose and a funnel are normally used to add water into the reservoir of a tree stand to keep the tree fresh and green during the entire holiday season. In most Christmas tree watering systems, a valve is mounted inside the reservoir of the tree stand to stop the flow of water from the hose and funnel when the water has reached a predetermined level inside the reservoir. The backflow of water inside the funnel indicates a full-reservoir condition.

Numerous Christmas tree watering systems have been developed in the past and have enjoyed varying degrees of success. Some watering systems of the prior art are known to occasionally fail to indicate a full-reservoir condition. This deficiency causes an overflow of water from the reservoir of the tree stand or from the funnel above the tree stand, to the floor. An overflow of water from the reservoir of the tree stand is a particular concern because that water often contains dissolved tree sap and other tree extracts which could stain a carpet permanently.

Christmas tree watering systems of a common type are described in the following documents;

U.S. Pat. No. 5,076,009 issued on Dec. 31, 1991 to Michael Cibor;
U.S. Pat. No. 5,522,179 issued on Jun. 4, 1996 to Peter R. Hollis;
U.S. Pat. No. 5,575,110 issued on Nov. 19, 1996 to Luc. M. Couture;
U.S. Pat. No. 6,073,390 issued on Jun. 13, 2000 to Stephen R. Baudier; and
U.S. Pat. No. 6,260,303 issued on Jul. 17, 2001 to George Lewis Sappenfield.

The type of Christmas tree watering systems described in these documents generally comprises a funnel on a Christmas ornament or at other elevated location along the tree. A hose is connected to the funnel and extends to a valve mounted inside the reservoir of the tree stand. The valve has a float therein moving with the water level inside the reservoir. The float carries a valve disc which coincides with the end of the hose, and blocks the end of the hose when the water in the reservoir rises to a predetermined level.

A second type of watering system is described in the U.S. Pat. No. 5,090,443 issued on Feb. 25, 1992 to Paul S. Jacobsen. This document discloses a float valve in which the end of the water hose is laying against a float. The float moves upward in a casing with the level of water in the reservoir of the tree stand, to bend the hose and block the flow of water inside the hose.

A third type of watering system is described in the U.S. Pat. No. 5,937,574 issued on Aug. 17, 1999 to David R. Jacques. This document discloses a float valve for a Christmas tree stand in which is mounted a float on the end of a lever. The lever is pivoted on a pin through its centre. A stud on the opposite end of the lever pushes a ball away from a valve seat thereby allowing a flow of water through the valve seat. As the float rises, the stud retracts and let the ball fall into the valve seat to block the flow of water through the valve seat.

In the prior art valves of the first and second types, the head pressure from the water inside the hose and the funnel forces the valve's flap or disc to open. In this arrangement, the inertia of a rush of water in the hose, such as in the case of an unsteady filling of the funnel, tends to open the valve, even when the float is partly submerged. Therefore, in order to properly close the valve, the float must first gain sufficient buoyancy to overcome this head pressure.

In the prior art valve of the third type, the inflow of water in the hose acts directly against the ball of the valve forcing it to close unexpectedly or prematurely, thereby generating an overflow of water over the rim of the funnel.

As such, it may be appreciated that there continues to be a need for a new and improved float valve which is not susceptible of slow closure because of a head pressure and is not susceptible of premature closure from a flow surge inside the inlet hose.

SUMMARY OF THE INVENTION

The float valve according to the present invention comprises a lift valve wherein the valve disc closes against a valve seat in a same direction as the flow of water through the valve seat, and wherein the valve stem and disc are movable sideways from the flow of water to avoid the force of the flow of water through the valve seat. A movement of the float with the rising water pulls the valve disc back into the flow of water such that this flow assists the float in closing the valve. The float valve is thereby reliable for indicating a full-reservoir condition in a timely manner.

In accordance with one feature of the present invention, there is provided a float valve for use in a Christmas tree watering system. The float valve comprises a housing having an upper portion, a water inlet in the upper portion, and a perforated bottom surface. A lift valve inside the float valve has a circular valve seat between the water inlet and the perforated bottom surface; a valve disc mounted between the water inlet and the valve seat and a valve stem extending from the valve disc through the valve seat.

The float valve according to the present invention also has a mechanism to raise and lower the valve disc in response to a water level inside the housing. In this arrangement, the valve seat has a first vertical axis and the water inlet has a second vertical axis and the first and second vertical axes are parallel to each other and are spaced apart a distance corresponding substantially to a radius of the valve seat.

Because of this structure, the flow of water through the valve seat is offset from the valve seat and from the valve disc whereby it is less susceptible of applying a force on the valve disc in a closing direction, when the valve seat is fully open.

In accordance with another feature of the present invention, the mechanism to raise and lower the valve disc comprises a float and a rocker arm pivotally connected to the housing, to the float and to the valve stem for a seesaw movement with the float and the valve stem. The rocker arm has a clevis on one end thereof. The valve stem is pivotally mounted in the clevis and the rocker arm has a stud thereon adjacent the clevis. The stud interferes with the valve stem for blocking a movement of the valve stem in the clevis and for leaning the valve stem away from the axis of the water inlet.

When the float is in a lower position, the valve disc is positioned away for the flow of water through the valve seat and does not restrict the flow of water through the valve seat. When the float rises to a prescribed level, however, the float pulls the valve stem and the valve disc back into the axis of the valve seat whereby the flow of water through the valve seat helps to close the valve.

Upon closure of the valve, the water level rises quickly into the hose and the funnel at a same rate as the water added into the funnel, to reliably indicate a full-reservoir condition.

Still another feature of the float valve of the present invention is that it is susceptible of a low cost of manufacture with regard to both materials and labour, and which accordingly is then susceptible of low prices of sale to the consumer, thereby making such float valve economically available to the public.

Other advantages and novel features of the present invention will become apparent from the following detailed description of the preferred embodiment.

BRIEF DESCRIPTION OF THE DRAWINGS

One embodiment of the present invention is illustrated in the accompanying drawings, in which like numerals denote like parts throughout the several views, and in which:

FIG. 3 is a cross-section view of the preferred float valve in a closed mode, as seen along a vertical plane passing widthwise through the valve housing;

FIG. 4 is another cross-section view of the float valve, in an open mode;

FIG. 5 is a perspective view of the clip holding the housing halves together.

DESCRIPTION OF THE PREFERRED EMBODIMENT

Figure 1:
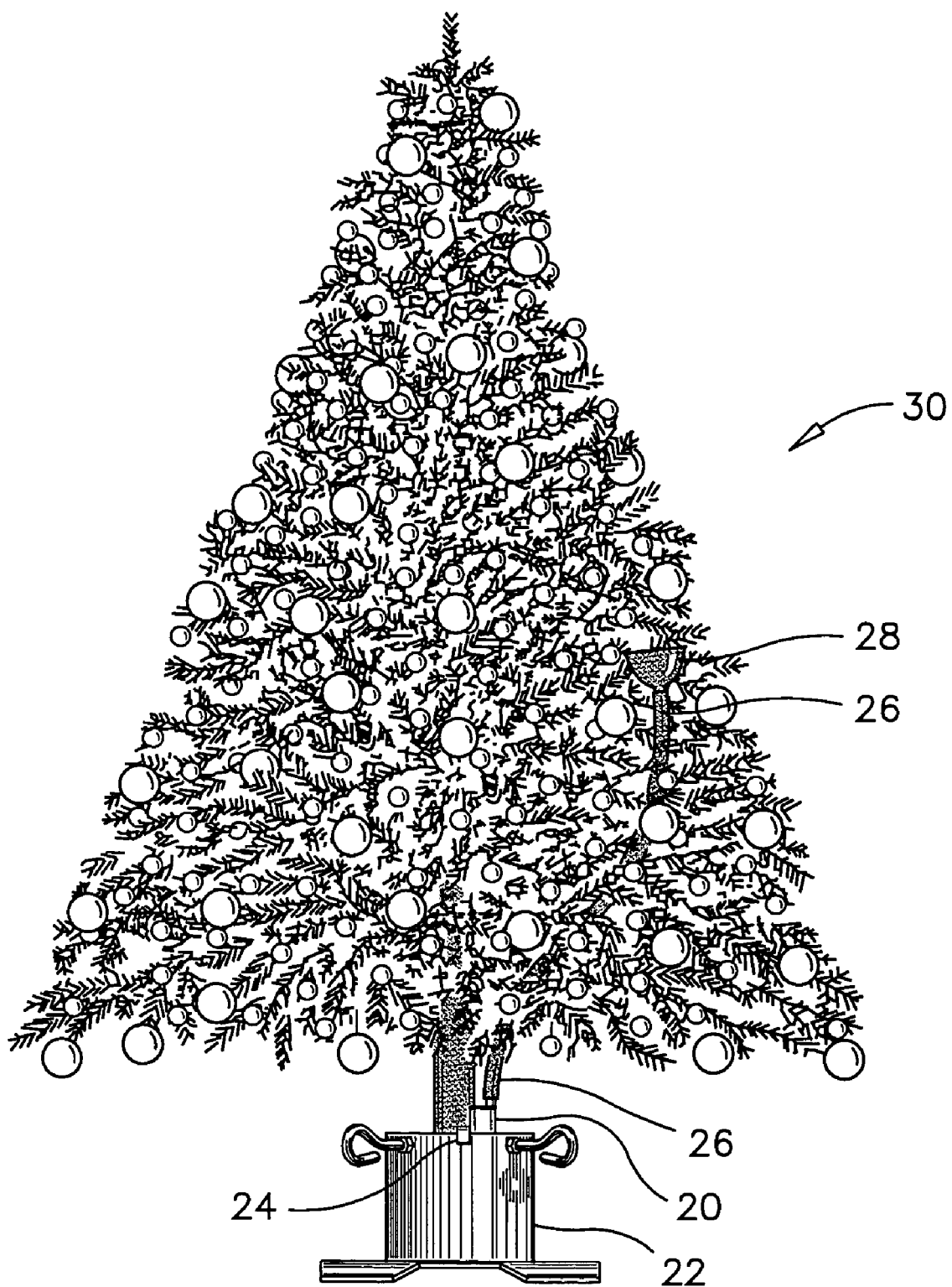
FIG. 1 illustrates a Christmas tree and a preferred tree watering system comprising the float valve according to the preferred embodiment.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described.

Referring to FIG. 1, one best mode of using the float valve of the present invention in a Christmas tree watering system is illustrated therein. In this illustration, the float valve 20 is mounted inside a tree stand reservoir 22 and is retained to the rim of the tree stand reservoir by a clip 24. A hose 26 extends from the float valve 20 to a funnel 28 mounted at a convenient height in the Christmas tree 30. In the preferred embodiment, the hose 26 is coloured to blend in with the branches of the tree and the funnel 28 is decorated as a Christmas ornament. Water is added into the funnel 28 until the float valve shuts off and a backflow of water is observed in the funnel 28. The height of the float valve 20 is selected so that the reservoir 22 contains a proper level of water therein when the backflow is observed in the funnel 28. The content of the funnel 28 and of the hose 26 may then seep down slowly into the tree stand reservoir 22 without overfilling the reservoir.

Figure 2:
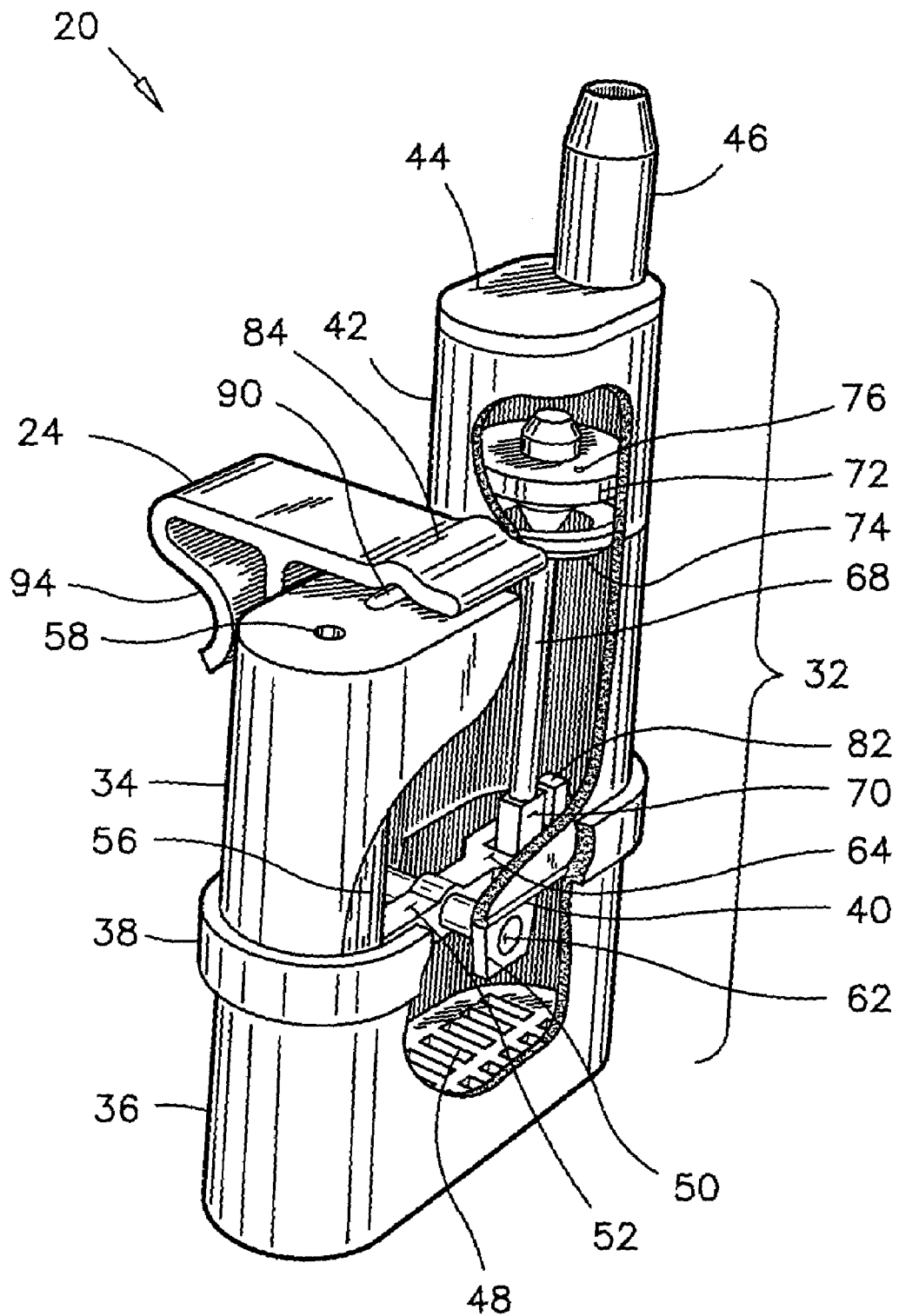
FIG. 2 is a perspective view of the float valve according to the preferred embodiment with the housing broken away to illustrate the internal structure thereof.

Referring now to FIGS. 2–4 simultaneously, the structural arrangement and operation of the float valve 20 according to the preferred embodiment will be described in details.

The float valve 20 has a housing 32 made of an upper half 34 and a lower half 36 joined together at a horizontal seam 38. The seam 38 preferably comprises a ridge and groove lock 40 such that the two halves 34, 36 are separable from each other for periodically cleaning the interior of the valve housing 32.

The upper portion of the upper half 34 comprises a valve compartment 42 which is covered by a cap 44. A hose nipple 46 extends upward from the cap 44. The lower half 36 of the valve housing 32 has a perforated bottom surface 48 which is illustrated in FIG. 2. In use, water is introduced in the valve housing 32 through the hose nipple 46 and flows out of the housing through the perforations in the bottom surface 48.

The upper half 34 of the valve housing 32 has a pair of holed tabs 50, holding a rocker arm 52 by its middle segment. The upper half 34 of the valve housing 32 also has a float guiding cavity 54 in which is mounted a cylindrical float 56. The float 56 is free to move up and down according to the level of water in the housing 32. The upper half 34 of the valve housing 32 has a vent hole 58 in the upper wall thereof to evacuate trapped air from the float guiding cavity 54 during the movement of the float 56.

The rocker arm 52 has a rounded end 60, a transverse shaft 62 through its middle segment and a clevis 64 on the other end thereof. That other end is also referred to as the clevis end. The transverse shaft 62 is mounted in the holed tabs 50 for a seesaw movement of the rocker arm about the holed tabs 50.

The float 56 has a socket 66 in its side in which is engaged the rounded end 60 of the rocker arm 52, for causing the rocker arm 52 to move with the float 56.

The float valve 20 also comprises a valve stem 68 with a lower thick end 70 and a valve disc 72 mounted on the upper end of the stem 68.

The thick lower end 70 is pivoted in the clevis 64 of the rocker arm 52. The valve stem 68 has an appropriate length such that the valve disc 72 moves up and down inside the valve compartment 42 in response to a movement of the float 56 and the rocker arm 52.

A valve seat 74 in the bottom surface of the valve compartment 42 creates a partition between the valve compartment 42 and the upper half 34 of the housing.

The valve stem 68, the valve disc 72 and the valve seat 74 constitutes a poppet-type valve also referred to as a lift valve.

The valve stem 68 is further dimensioned to engage the valve disc 72 into the valve seat 74 and seal the valve seat 74 when the float 56 is in its upper position as illustrated in FIG. 3. It will be appreciated that an upward movement of the float 56 causes the rocker arm to tilt and to pull the valve stem 68 downward to close the valve seat 74 and to stop the flow of water between the valve compartment 42 and the upper and lower halves 34, 36 of the housing 32.

A seep hole 76 which is illustrated in FIG. 2 may be provided through the valve disc 72 to slowly drain the content of the hose 26 and of the funnel 28 following an addition of water to the reservoir 22 of a tree stand. Although a seep hole 76 is illustrated, it will be appreciated that the same result may be obtained with an imperfect seal between the valve disc 72 and the valve seat 74.

Referring particularly to FIG. 4, the axis 78 of the hose nipple 46 is offset from the axis 80 of the valve seat 74 by a distance 'A' corresponding substantially to the radius of the valve seat 74. The advantage of this offset is that only a limited portion of the water flowing into the valve compartment washes against the valve disc 72 and the corresponding downward force on the valve disc 72 is relatively small.

In order to further reduce the amount of water washing against the valve disc 72, a short stub 82 is provided on the rocker arm 52 adjacent the clevis 64. This short stub 82 pushes against the thick end 70 of the valve stem 68 when the rocker arm is tilted in the valve-open position as illustrated in FIG. 4, and causes the valve stem 68 and the valve disc 72 to lean away from the axis 78 of the hose nipple 46. When the valve disc 72 is in this position, very little water washes against the valve disc 72 and only a negligible downward force is applied against the valve disc 72.

Referring back to FIG. 3, the short stub 82 moves away from the thick end 70 of the valve stem 68 when the rocker arm 52 moves to a valve-closed position as illustrated in that drawing. Therefore the valve disc 72 is then free to align with the valve seat 72 to close the valve seat. When the rocker arm moves toward the position illustrated in FIG. 3, the valve disc 72 is brought back in alignment with the valve seat 74 and into the flow of water through the valve seat, whereby this flow enhances the closing of the valve seat 74 by the valve disc 72.

For reference purposes, the size and material of the float 54 is selected such that its buoyancy causes the valve disc 72 to close the valve seat 74 when the water level inside the housing 32 is slightly above the seam 38.

The clip 24 of the preferred valve 20 is illustrated in its entirety in FIG. 5. The clip 24 has an upper and lower identical grooves, labelled 84, 86 respectively. The grooves 84, 86 face each other and are separated by a riser 88 having a length substantially the same as the height of the upper and lower halves of the housing 32. In use, the clip 24 mounts to the housing 32 to enclose the housing 32 and to keep both halves 34, 36 together. The upper groove 84 engages over a ridge 90 on the top of the upper half 34, as best seen in FIG. 2. The lower groove 86 engages over a second ridge 92 which is only partly illustrated in FIGS. 3 and 4, extending over the exterior bottom surface of the lower half 36. It will be appreciated from the illustrations that although the second ridge 92 is only partly illustrated, it has substantially a same cross-section as the first ridge 90 for engagement into a similar groove as for the first ridge.

In addition to keeping both halves together, the clip 24 is well fastened to the housing 32 by the engagement of the grooves 84, 86 and ridges 90, 92, and is used to support the housing to the rim of a reservoir as previously illustrated. For this purpose the clip 24 has a curved lip 94 on its upper end opposite the upper groove 84 relative to the riser 88. The curved lip 94 defines a hook 96 on the riser 88 for attachment to the rim of a tree stand reservoir.

All the components of the preferred float valve are made of plastic by injection molding for example.

As to other manner of usage and operation of the present invention, the same should be apparent from the the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A valve for use in a Christmas tree watering system, comprising;
    a housing having an upper portion, a water inlet in said upper portion and a perforated bottom surface;
    a lift valve mounted in said housing and having a circular valve seat between said water inlet and said perforated bottom surface;
    a valve disc mounted between said water inlet and said valve seat and a valve stem extending from said valve disc through said valve seat; and
    means to raise and lower said valve disc in response to a water level in said housing;
    said valve seat having a first vertical axis and said water inlet having a second vertical axis and said first and second vertical axes being parallel to each other and spaced apart a distance corresponding substantially to a radius of said valve seat.

2. The valve as claimed in claim 1, wherein said housing comprises a clip having a hook thereon for attachment to the rim of a Christmas tree stand.

3. The valve as claimed in claim 2, wherein said clip is detachably fastened to said housing by ridge and groove engagements.

4. The valve as claimed in claim 2 wherein said housing has two separable halves and said clip encloses said two halves to retain said two halves together.

5. The valve as claimed in claim 4 wherein said means to raise and lower said valve disc comprises a float.

6. The valve as claimed in claim 5 wherein said housing comprises a float guiding cavity and said float is movably mounted in said float guiding cavity.

7. The valve as claimed in claim 6, wherein said means to raise and lower said valve disc also comprises a rocker arm pivotally mounted to said housing and engaged with said float and said valve stem.

8. The valve as claimed in claim 7, wherein said rocker arm has a rounded end and said float has a socket, and said rounded end is mounted in said socket, whereby a movement of said float is transmitted to said rocker arm.

9. The valve as claimed in claim 8, wherein said rocker arm has a clevis end and said valve stem has a thick end, and said thick end is pivotally engaged with said clevis end, whereby a movement of said rocker arm is transmitted to said valve stem and said valve disc.

10. The valve as claimed in claim 9, wherein said two separable halves comprises an upper half and a lower half, and said lift valve, said float guiding cavity, said float and said rocker arm are mounted in said upper half.

11. The valve as claimed in claim 10, wherein said upper half has a pair of holed tabs therein and said rocker arm has a transverse shaft pivotally mounted in said pair of holed tabs.

12. The valve as claimed in claim 1, wherein said valve disc has a seep hole there through.

13. The valve as claimed in claim 6, wherein said float guiding cavity has a vent hole there through.

14. The valve as claimed in claim 1, wherein said water inlet comprises a hose nipple.

15. A valve for use in a Christmas tree watering system, comprising
- a housing having an upper half, a water inlet in said upper half, and a lower half;
- a lift valve having and a circular valve seat between said water inlet and said lower half; a valve disc mounted between said water inlet and said valve seat and a valve stem extending from said valve disc through said valve seat;
- means to raise and lower said valve disc in response to a water level in said housing;
- said valve seat having a first vertical axis and said water inlet having a second vertical axis and said first and second vertical axes being spaced apart and parallel to each other; and
- means to selectively move said valve disc away from said second vertical axis.

16. The valve as claimed in claim 15 wherein said means to raise and lower said valve disc comprises a float and a rocker arm pivotally connected to said housing, to said float and to said valve stem for a seesaw movement between said float and said valve stem.

17. The valve as claimed in claim 16, wherein said rocker arm has a clevis on one end thereof, said valve stem is pivotally mounted in said clevis and said means to selectively move said valve disc comprises a stud on said rocker arm adjacent said clevis interfering with said valve stem and blocking a movement of said valve stem in said clevis.

18. The valve as claimed in claim 15, wherein said second vertical axis is offset from said first vertical axis a distance equivalent to a radius of said valve seat.

19. A valve for use in a Christmas tree watering system, comprising
- a housing having an upper half, a water inlet in said upper half, and a lower half;
- a lift valve having a circular valve seat between said water inlet and said lower half; a valve disc mounted between said water inlet and said valve seat and a valve stem extending from said valve disc through said valve seat;
- means to raise and lower said valve disc in response to a water level in said housing;
- said valve seat having a first vertical axis and said water inlet having a second vertical axis and said first and second vertical axes being parallel to each other and spaced apart a distance corresponding to a radius of said valve seat; and
- means to offset said valve disc from said second vertical axis, and away from said first vertical axis.

20. The valve as claimed in claim 19, wherein said means to offset said valve disc comprises means to lean said valve stem away from said first vertical axis.

* * * * *